US009261755B2

(12) United States Patent
Van de Roer et al.

(10) Patent No.: US 9,261,755 B2
(45) Date of Patent: Feb. 16, 2016

(54) SYSTEM AND METHOD FOR PRODUCING VIRTUAL LIGHT SOURCE MOVEMENT IN MOTION PICTURES AND OTHER MEDIA

(71) Applicants: Carlo Van de Roer, Brooklyn, NY (US); Stuart Rutherford, Paraparaumu Beach (NZ)

(72) Inventors: Carlo Van de Roer, Brooklyn, NY (US); Stuart Rutherford, Paraparaumu Beach (NZ)

(73) Assignee: Satellite Lab, LLC, Lewes, DE (US)

( * ) Notice: Subject to any disclaimer, the term of this patent is extended or adjusted under 35 U.S.C. 154(b) by 0 days.

(21) Appl. No.: 14/251,544

(22) Filed: Apr. 11, 2014

(65) Prior Publication Data

US 2014/0306622 A1   Oct. 16, 2014

Related U.S. Application Data

(60) Provisional application No. 61/810,899, filed on Apr. 11, 2013.

(51) Int. Cl.
*G03B 15/02* (2006.01)
*G03B 41/14* (2006.01)
*G03B 15/05* (2006.01)

(52) U.S. Cl.
CPC ............... *G03B 15/05* (2013.01); *G03B 41/14* (2013.01); *G03B 2215/0567* (2013.01)

(58) Field of Classification Search
CPC ............................ G03B 15/02; G03B 1541/14
USPC .................. 315/312, 314, 315, 317, 321, 323
See application file for complete search history.

(56) References Cited

U.S. PATENT DOCUMENTS 2,008,938 A   7/1935   Tolhurst
3,239,660 A   3/1966   Hall, Jr.
(Continued)

FOREIGN PATENT DOCUMENTS

WO       9532581 A1    11/1995

OTHER PUBLICATIONS

Derek Bradley, "Synchronization and Rolling Shtter Compensation for Consumer Video Camera Arrays", University of British Columbia, pp. 1-8.*

(Continued)

*Primary Examiner* — Daniel D Chang
(74) *Attorney, Agent, or Firm* — Russ Weinzimmer & Associates, P.C.

(57) ABSTRACT

A system and method is disclosed by which the movement of virtual continuous light sources illuminating various objects or persons in a scene, can be simulated over arbitrary paths throughout the captured scene. The simulated movement of each virtual continuous light source through a captured scene can be created using a stationary array of discrete light sources, and for which no physical movement of the array or the discrete light sources is required. The actuation of each of the discrete light sources can be performed sequentially according to a pre-specified sequence by a controller. Control signals for actuating the discrete light sources are synchronized with frames captured by a camera, such that the camera never sees the transitions from illuminating one discrete light source of the array to illuminating another. Thus, with respect to the images of the scene captured by the camera, it appears that a single and continuous light source is moving along a path that is dictated by the configured arrangement of the array, as well as the sequence of illumination for the discrete light sources of the array from frame to frame.

21 Claims, 5 Drawing Sheets

(56) References Cited

U.S. PATENT DOCUMENTS

| | | | |
|---|---|---|---|
| 5,486,914 | A | 1/1996 | Denove et al. |
| 5,772,302 | A | 6/1998 | Ishikawa et al. |
| 6,480,679 | B1 | 11/2002 | Ishida et al. |
| 6,545,742 | B2 * | 4/2003 | O'Hagan .................... 352/199 |
| 6,685,326 | B2 | 2/2004 | Debevec et al. |
| 6,947,666 | B2 | 9/2005 | Chapman et al. |
| 6,983,082 | B2 | 1/2006 | Duiker |
| 7,180,426 | B2 | 2/2007 | Rubtsov |
| 7,567,293 | B2 | 7/2009 | Perlman et al. |
| 2012/0187838 | A1 * | 7/2012 | Hanna ............................ 315/76 |
| 2013/0135358 | A1 | 5/2013 | Yin et al. |

OTHER PUBLICATIONS

Website Link—http://28photography.blogspot.com/2008/07/speedcycler.html downloaded Feb. 5, 2014. 28PHOTOGRAPH, "Speedcycler".

Website Link—http://www.cs.ubc.ca/~heidrich/Papers/ProCams.09.pdf downloaded Feb. 5, 2014. Derek Bradley et al., University of British Columbia "Synchronization and Rolling Shutter Compensation for Consumer Video Camera Arrays".

* cited by examiner

SYSTEM AND METHOD FOR PRODUCING VIRTUAL LIGHT SOURCE MOVEMENT IN MOTION PICTURES AND OTHER MEDIA

CROSS-REFERENCE TO RELATED APPLICATIONS

This application claims the benefit of priority from U.S. Provisional Application Ser. No. 61/810,899, filed Apr. 11, 2013 and entitled "System for producing virtual light source movement in motion pictures and other media," which is incorporated herein in its entirety by this reference.

FIELD OF THE INVENTION

This application relates generally to lighting for image capture and other related media, and more particularly to special effects simulating the movement of light sources illuminating a scene.

BACKGROUND OF THE INVENTION

Numerous techniques have been developed to provide special effects in film and captured digital footage and other forms of visual media through the manipulation of physical light sources to alter the manner in which the light from such sources impinge upon various objects or persons in a scene. By altering the position from which the light from a light source is directed upon a subject during filming or digital capture, various desirable artistic effects may be achieved that can enhance viewing enjoyment during playback.

These techniques have often heretofore involved placing continuous light sources on tracks or vehicles, and more recently robotic arms, by their physical location may be altered during filming or digital capture. Known techniques are limited by a number of factors. First, continuous light sources that provide sufficient illumination to achieve are typically in the 10,000 to 20,000 watt range. As such, they are very large and heavy, making it very difficult to move them over any significant distance and with the speed required by high-speed digital cameras employed today.

For example, high-speed filming or digital image capture might be used to capture action that lasts only fractions of a second. Such action is filmed or digitally captured at a frame rate that permits the capture of hundreds to thousands of frames over such a small duration of time, thereby permitting a slow-motion or even "frozen-in-time" presentation of the action during playback at a more typical frame rate. It would be impossible to move a conventional continuous light source around in the fractions of a second that would be required to capture movement of one or more light sources during such a short duration.

Moreover, such techniques are very expensive, cumbersome to coordinate with the filming or digital image capture process, and are limited in their general applicability. For example, it might be desirable to change the shape of the path over which the light source travels from one scene to another, or to create alternate path shapes for a given scene. It might also be useful to move more than one source each over a different path.

SUMMARY OF THE INVENTION

The present invention is a system and method by which the movement of virtual continuous light sources illuminating various objects or persons in a scene, can be simulated over arbitrary paths throughout the filmed or digitally captured scene. The simulated movement of each virtual continuous light source through a filmed or digitally captured scene can be created using a stationary array of discrete light sources, and for which no physical movement of the array or the discrete light sources is required.

The illumination of each of the discrete light sources can be actuated in accordance with a pre-specified sequence in synchronization with each frame of the image capture process of a camera used to film or digitally capture the scene, such that the camera never sees the switching or sequencing from one discrete light source of the array to another. Thus, to the images of the scene captured by the camera, it will appear that a single and continuous light source is moving along a path that is dictated by the configured arrangement of the array, as well as the pre-specified sequence of illumination for the array from frame to frame.

In accordance with an embodiment of a system of the invention for simulating movement of a virtual continuous light source along a path during a filmed or digitally captured scene, the system includes at least one camera for capturing a sequence of frames of the scene at a predetermined frame rate. It further includes at least one array of n discrete light sources configured to define the path, each of the n discrete light sources of the at least one array being oriented to illuminate at least a portion of the scene when actuated. The system further includes a controller having an output interface, the output interface providing at least one of a plurality of control signals to each of the n discrete light sources, the control signals configured to actuate each of the n discrete light sources. The controller then generates the control signals to actuate the discreet light sources in accordance with a pre-specified sequence, the control signals being generated synchronously with a synch signal, the synch signal generated at the onset of each captured frame and coupled as an input to the controller.

In another embodiment, the discrete light sources are strobe lights, the strobe lights having a predetermined duration of illumination when actuated. In another embodiment, the discrete light sources are light emitting diodes (LEDs).

In a further embodiment, the synch signal is generated by the at least one camera.

In other embodiments, the controller receives a trigger input, the trigger input defining when the controller should begin generating control signals to actuate the discrete light sources of an array.

In other aspects of the invention, each of the n discrete light sources in the at least one array are separated from adjacent ones of the discrete light sources by a constant distance. In an alternate embodiment, the n discrete light sources in the at least one array are separated from adjacent ones of the discrete light sources by an increasing distance.

In yet another embodiment, the controller includes an input interface for receiving input including the pre-specified sequence for the at least one array, the pre-specified sequence data dictating to the controller the order in which the n discrete light sources are to be actuated for each captured frame.

In another embodiment, the controller is a general purpose computer.

In another embodiment, the system has at least a first and a second array, the first array having n discrete light sources and the second array having less than n discrete sources. The actuation of each of the discrete light sources of the second array in accordance with a pre-specified sequence for the second array is delayed until the number of frames remaining to be captured by the at least one camera is equal to the number of discrete sources in the second array.

In a method of the invention for simulating movement of each of one or more virtual continuous light sources along a path during a filmed or digitally captured scene, the method includes providing an array of discrete light sources for each of the one or more virtual continuous light sources, the array being configured in accordance with the path over which the movement of the virtual continuous light source is to be simulated. The method further includes arranging each of the discrete light sources of an array to illuminate at least a portion of the scene to be filmed or digitally captured. For each of the arrays, a pre-specified sequence is established for each of the discrete light sources of the array. The scene is filmed or digitally captured using at least one camera at a predetermined frame rate for a predetermined number of frames. The discrete light sources are actuated for each array on a frame by frame basis in accordance with the pre-specified sequence established for that array as the scene is filmed or digitally captured.

In an embodiment, the method further includes playing back the captured images of the frames of the scene.

In a further embodiment, the discrete light sources are strobe lights. In an alternate embodiment, the discrete light sources are LEDs.

In still other embodiments, actuating is performed synchronously with the onset of each captured frame on a frame by frame basis. In another embodiment, the said actuating includes generating control signals to actuate each of the discrete light sources in accordance with the pre-specified sequence, control signals generated synchronously in conjunction with a synch signal that is generated by the at least one camera while performing said image capture.

In another embodiment, the actuating for an array is independently gated by a triggering signal for each of the one or more arrays. In further embodiments, the controller includes a general purpose computer coupled to an output interface for generating the control signals. In a further embodiments, the input interface is a graphical user interface (GUI).

In yet another embodiment, the controller is a general purpose computer coupled to the output interface. In another embodiment, at least some of the discrete light sources in at least one array are separated from adjacent ones of the discrete light sources by a variable distance.

BRIEF DESCRIPTION OF THE DRAWINGS

The following description can be better understood in light of Figures, in which.

DETAILED DESCRIPTION

Figure 1:
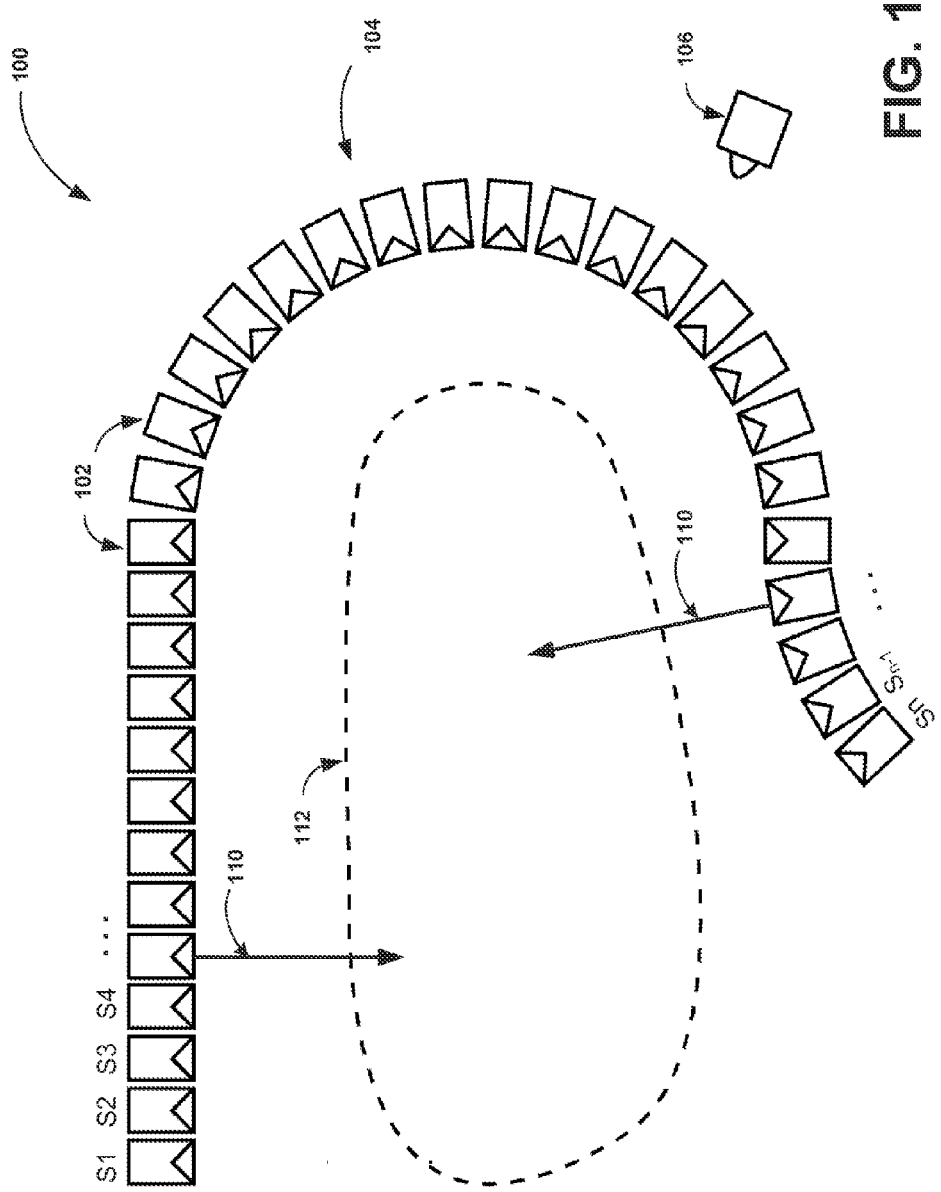
FIG. 1 illustrates a top view of an embodiment of the system of the invention having a single array of discrete light sources deployed as a single array defining a path along which movement of a virtual continuous light source is to be simulated.

Various embodiments of a system and method for simulating movement of virtually continuous light sources are disclosed, which require no actual physical movement of a continuous light source during filming or digital image capture of a scene. The system and method of the invention further makes it possible to simulate movement of each of one or more light sources that appear to be continuously illuminated (i.e. virtually continuous) as their movement along the same or different paths of virtually any shape and size are simulated.

It should be noted that most media is now created digitally. Thus, the term film or filmed is somewhat antiquated. The terms captured or digitally captured or digital image capture have been used throughout to recognize this. However, the present invention is capable of working for both digital and film, and thus the more generic term "captured" is used to denote the process of capturing an image, independent of whether the image is captured on film or in a digital memory. Moreover, the term "footage" is used where possible to denote a series of frames of captured images, whether digital or on film. In no event should any distinction be made between terms connoting digital and analog image capture unless specifically set forth herein.

Embodiments of the invention are able to simulate physical movement of each of one or more virtually continuous light sources along predetermined paths by employing one or more arrays of discrete light sources that are fired (i.e. actuated) in a pre-determined sequence or order in conjunction with the frame rate of a camera employed to capture a scene illuminated by the discrete light sources comprising the one or more arrays. Put another way, the discrete light sources of the array(s) are used to illuminate one or more subjects within a scene, on a frame by frame basis, as those frames of the scene are captured by a camera. The particular discrete light source(s) of one or more such arrays that are illuminated during one frame, are actuated such that the duration of their illumination does not last beyond commencement of the next frame, so that the camera does not actually capture transitions between the discrete light sources.

The resulting virtual continuous light sources that appear in the footage can be simulated to travel at constant speed, can be made to appear as if they are accelerating or decelerating, and multiple virtual continuous light sources can be simulated to travel at the same or different speeds along the same or different paths. The virtual continuous light sources can be simulated at image capture speeds up to and exceeding frame rates of at least 10,000 frames per second.

Those of skill in the art will recognize that the only limitations on the speed of operation for various embodiments of the invention is the frame rate of the camera(s) used to capture the scene, and the ability of the discrete light sources to be actuated or fired with an "on" duration that matches or exceeds the frame rate of the camera so that the transitions between the discrete light sources is not captured by the camera. The simulated path of each virtual continuous light source, as dictated by the configured geometry of the array for each virtual continuous light source, can be configured to surround the scene or through the scene, depending upon if it is desirable to for the camera to capture the virtual light source as part of the scene as it moves through the scene.

FIG. 1 illustrates one embodiment of the invention 100, wherein a single array 104 of n discrete light sources 102 are deployed along a path that has a straight line, a concave curve and a convex curve. The discrete light sources can be, for example, strobe lights, LEDs (light emitting diodes), or any other light source that can be actuated within the frame at the frame rate to be employed, while also providing sufficient illumination of the scene over the duration of a frame at that frame rate. Those of skill in the art will appreciate that strobe lights are suitable for operation as discrete light sources as they provide very high illumination output over short time duration, and the duration of their illumination can be pre-programmed so that they may be edge-triggered (i.e. fired) by a control signal. It is also possible to switch the discrete light sources both on and off as well.

The discrete light sources 102 are directed at a common scene or area 112, which may include one or more subjects but is otherwise not limited to a single point of focus. Arrows 110 indicate the direction of illumination for certain of the discrete light sources 102. Camera 106 is disposed at any desired point from which to capture the scene or area 112 and the subject(s) disposed therein (not shown).

In an embodiment, discrete light sources 102 of the array 104 can be fired in a pre-established sequence, beginning, for example, with discrete light source S1, then S2, then S3 and so on up to the $n^{th}$ discrete light source Sn. Each discrete light source can be fired in response to a control signal generated by a controller (510, FIG. 4), the control signal for each discrete light source preferably being synchronized with a sync signal (506, FIG. 4) that can be generated by camera 106 during image capture to demarcate the onset of each frame (the point where the actuation of the shutter of the camera is actuated).

For example, in one embodiment, the sync signal (506, FIG. 4) is generated at the beginning of each frame captured by the camera 106, thus having a frequency equal to the frame rate of the camera 106. The synch signal (506, FIG. 4) is provided as an input to the controller (510, FIG. 4) of the system 100 to generate control signals C1-Cn that are each used to fire at least one of the individual discrete light sources 102 based on pre-established sequencing data stored in a memory of controller (510, FIG. 4). The pre-established sequencing data can be input into the controller (510, FIG. 4) of system 100 through an input interface prior to capture of the scene 112, as will be described in more detail below. Those of skill in the art will appreciate that each of the discrete light sources 102 may be assigned to a unique one of the control signals, but may also be grouped and controlled by a single control signal as a group.

It should also be noted that the sequence as determined may be triggered by a separate signal to the controller (not shown) that can be actuated manually, by actions or events occurring during capture of the scene 112, or could simply be triggered by the first synch signal received from the camera 106. In this way, the sequence can be enabled at any time during capture of the scene, and the first discrete light source 102 in the sequence will be fired by its control signal in receipt of the next synch pulse from the camera 106 after the trigger signal is received.

In this way, each time the camera captures a new frame of image information, it appears that the virtual continuous light source has moved incrementally to a new location. Provided that only one discrete light source 102 of array 104 is on when the camera is capturing a frame, it will appear during playback of the captured image information of the scene 112 that a virtual continuous light source (it is a "virtually" continuous light source because despite the fact that it appears to be illuminated continuously in the footage as the frames are being played back, it is in reality being generated by a sequence of discrete and non-continuously illuminated light sources) appears to be moving along the path of the array at the frame rate of the camera. Put another way, the previously fired discrete light source 102 of array 104 should be substantially off, and the next discrete light source 102 in the sequence of array 104 should be on at the point where capture of the next frame is initiated by the camera.

Figure 2:
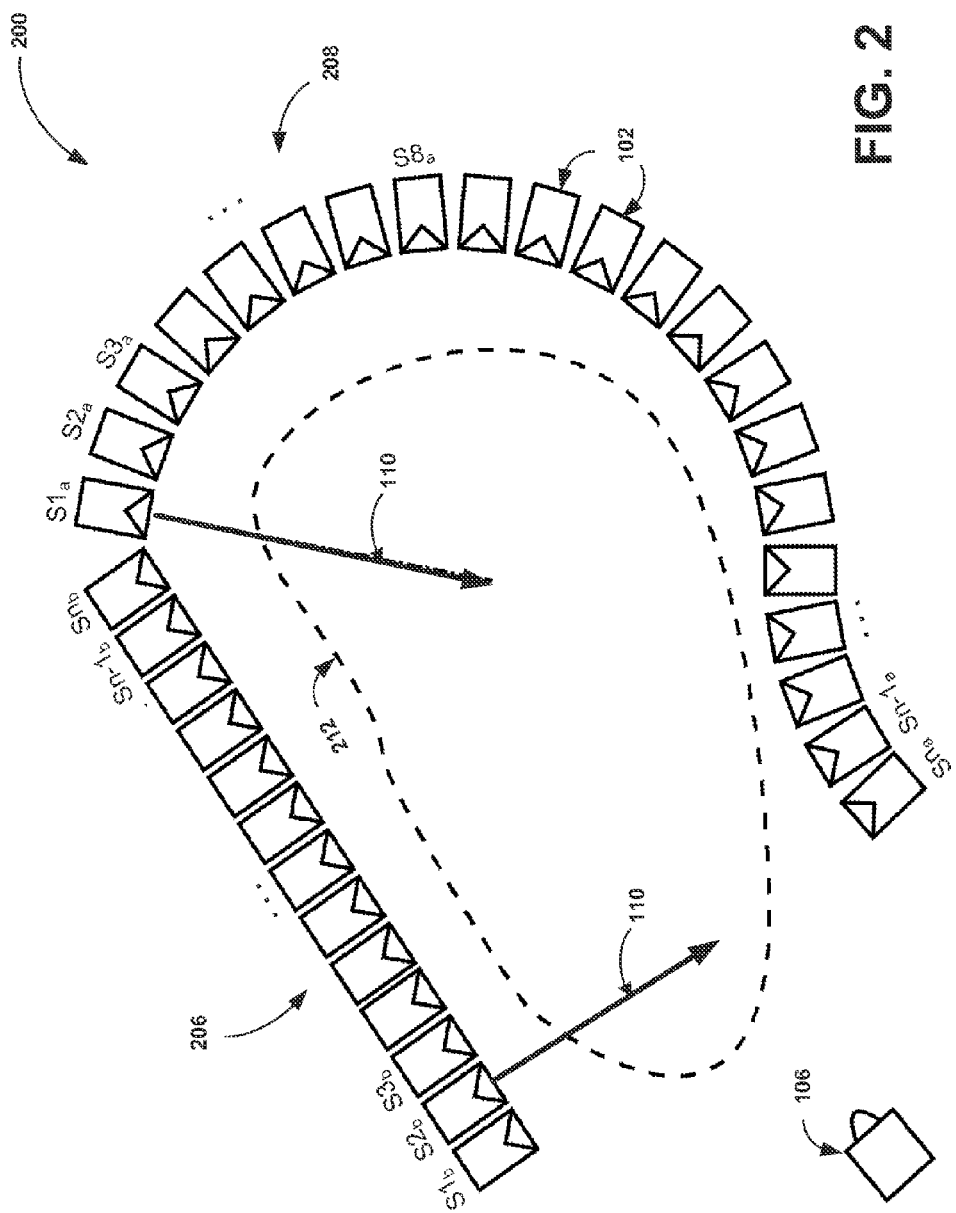
FIG. 2 illustrates a top view of an embodiment of the system of the invention having two distinct arrays of discrete light sources each defining a path along which movement of a virtual continuous light source is to be simulated.

FIG. 2 illustrates a top view of an embodiment 200 of the system of the invention having two distinct arrays (206, 208) of discrete light sources 102 each defining a different path along which movement of a virtual continuous light source is to be simulated. Array 206 defines a substantially straight path along scene 212, and array 208 curves around scene 212. In an embodiment, firing of discrete light sources 102 of array 208 can be triggered (i.e. enabled by a trigger signal) at any time before or after a first frame captured by camera 106, with the firing of array 206 being triggered at a later time after triggering array 208. For example the firing sequence can be as follows:

---

Trigger to enable the sequence of array 208 is received by the controller 510.
Frame 1: Discrete light source S1a;
Frame 2: Discrete light source S2a;
Frame 3: Discrete light source S3a;
...
Frame 8: Discrete light source S8a;
Trigger signal to enable the sequence of array 206 is received by the controller 510.
Frame 9: Discrete light sources S1b and S9a;
Frame 10: Discrete light sources S2b and S10a;
...
Frame n: $Sn_b$ and $Sn_a$.

---

This embodiment demonstrates the general applicability of the system and method of the invention. The embodiment of FIG. 2 illustrates that the movement of two distinct virtual continuous light sources can be simulated over two distinct paths. Further, the virtual light source, the movement of which is simulated by array 208, can start moving earlier in the capture of the scene 212 versus the second virtual source, the movement of which is simulated by array 206, can start moving at a later frame in the footage captured of the scene 212. Thus, those of skill in the art will appreciate that each array of discrete light sources can be configured with virtually any number of discrete light sources Sn, with virtually any number of arrays.

Moreover, it will be appreciated by those of skill in the art that the pre-specified ordered sequence of the firing of discrete light sources 102 can be independent across each of the arrays, and can also be varied within each array. For example, the pre-specified firing sequence of array 208 could start in the middle of the array at S8a at Frame 1, proceed sequentially from their to $Sn_a$, and from there could then proceed to S1a fire in order until reaching the end at S8a. Each array could be even controlled to fire completely out of sequence if desired, or could be programmed to fire the same discrete light source 102 for more than one consecutive frame, thereby creating a pause in the simulated movement of the virtual light source. Finally, it will be appreciated that the movement of two virtual light sources could be simulated by a single array, by firing two discrete light sources 102 simultaneously in the array within the same frame for each frame. For example, during Frame 1, S8a and S9a could be fired, and during Frame 2, S7a and S10a could be fired and so on.

As was the case with FIG. 1, the position of the camera for FIG. 2 is shown by 106. Those of skill in the art will recognize that camera 106 can be placed virtually anywhere within line of sight of scene 212, as desired. All the discrete light sources 102 of arrays 206 and 208 are directed at a common scene or area 212, which may include one or more subjects but which is not limited to a single point of focus. The example directions of the illumination from selected discrete light sources 102 is shown by the arrows 110.

Figure 3:
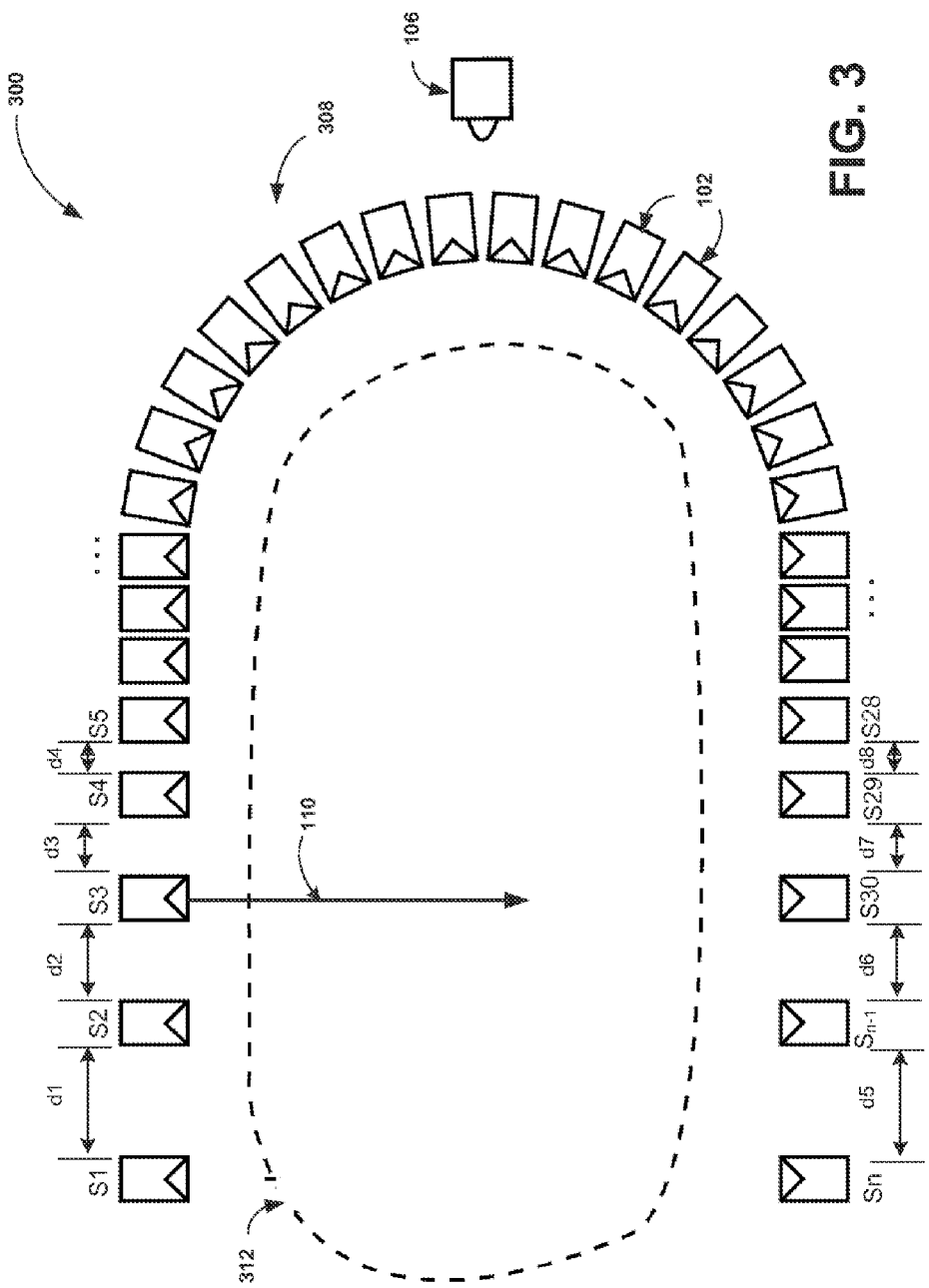
FIG. 3 illustrates a top view of an embodiment of the system of the invention showing one array of discrete light sources in an arc with unequal spacing between at least some discrete light sources of the array.

FIG. 3 illustrates a top view of an embodiment of the system of the invention showing one array 308 of discrete light sources 102 in an arc with unequal spacing between at least some discrete light sources 102 of the array. The five discrete light sources 102 at the beginning of array 308 (i.e. S1, S2, S3, S4, and S5) can be configured to have incrementally smaller distances (i.e. d1, d2, d3 and d4) between them. When fired in sequence and captured on a frame by frame basis as previously described, playback of the captured frames will give the impression that the simulated movement of the virtual light source is occurring at a decelerating rate.

Likewise, the final five discrete light sources 102 of array 308 (i.e. S28, S29, S30, Sn−1, and Sn) have incrementally larger distances (i.e. d8, d7, d6, and d5) between them. When fired in sequence and captured on a frame by frame basis as previously described, playback of the captured frames will give the impression that the movement of the simulated light source is occurring at an accelerating rate.

Figure 4:
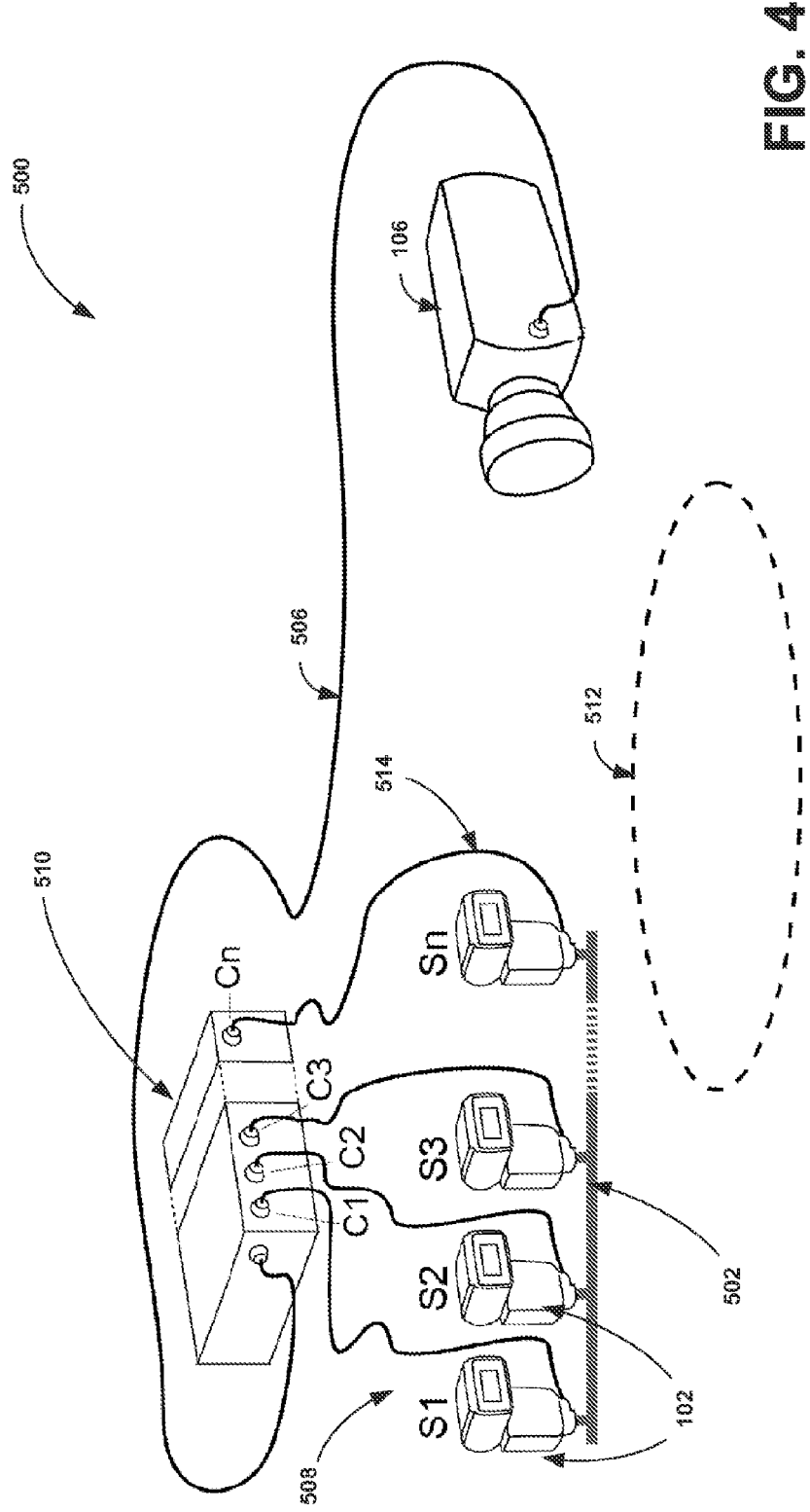
FIG. 4 illustrates how various components of an embodiment of the system of the invention can be operatively coupled together.

Thus, when the discrete light sources 102 of array 308 as configured in FIG. 4 are fired in numerical sequence on a frame by frame basis, the simulated movement of the virtual continuous light source appears first to decelerate, then remain constant in speed (during the section of the array 308 where the distance between the discrete light sources 102 is constant), and then appears to accelerate again up to the end of the path defined by the array 308. Those of skill in the art will appreciate that this will be the case when the playback speed is constant, (e.g. 30 fps (frames per second)). In another embodiment, acceleration and deceleration can be accomplished by adjusting the playback speed to achieve an effect where the virtual light source appears to be moving at a constant speed, but action within the captured subject/scene would appear to be accelerating or decelerating.

As discussed previously with respect to FIG. 1 and FIG. 2, the position of the camera is shown by camera 106, and all of the discrete light sources 102 are directed at a common scene or area 312 having a direction of illumination in accordance with exemplary arrows 110. Those of skill in the art will appreciate that any number of cameras may be employed to capture frames of the scene and from different positions. For example, two cameras are often used to create a stereoscopic effect. In embodiments where multiple cameras are employed, the synch signal can be generated by a camera 106 designated to be the master, and the other cameras can be slaved to the master to coordinate frame capture among the cameras.

Those of skill in the art will further appreciate that while the foregoing embodiments of the invention illustrate illumination of scenes 112, 212, and 312 that are contained within the arrays (104, 206, 208, 308) and therefore substantially surrounded by the simulated path(s) of the virtual continuous light source, it is also possible to turn the discrete light sources 102 outwardly, thereby illuminating the space outside of spaces 112, 212 and 312, thereby creating scenes that surround the spaces 112, 212 and 312 rather than being disposed therein.

FIG. 4 illustrates how various components of an embodiment of the system of the invention can be operatively coupled together. The synch signal output 506 of the camera 106 is coupled to Controller 510 via a connector. The synch signal 506 can be generated by camera 106 each time capture of a frame is initiated by camera 106. Controller 510 can provide a control signal (i.e. signals C1-Cn) 514 to each of the discrete light sources 102 of an array 508 through a connector such as a cable or wire.

Those of skill in the art will recognize that the synch input signal 506 and control output signals 514 can be provided through individual hardwired connections such as those illustrated in FIG. 4, or they can be provided through any other known type of input and output interface. For example, the signals could be transmitted wirelessly, through a Bluetooth or infrared connection. Controller 510 can be implemented as a dedicated box, combining a user interface (e.g. a graphical user interface (GUI)) through which the pre-specified triggering sequences may be input. In the alternative, the input interface and control functions of controller 510 could be implemented as a general purpose processing device such as a laptop, personal computer, PDA, tablet or smartphone, coupled to an output interface configured to generate the individual control signals based on commands received from the general purpose processing device.

Of course, those of skill in the art will appreciate that the processing device could also be used solely as the input interface, with a processor and memory residing with the output interface for purposes of performing the processing necessary to generate the synchronized control signals.

Controller 510 will have at least one processor and at least one non-transitory memory device for storing software that when executed by the processor, provides a user interface (not shown) through which sequencing data is entered for each of n discrete light sources 102 for each of one or more discrete light arrays 508. Execution of the processor further executes software that actuates its output interface to provide the control outputs necessary to fire the discrete light sources 102 in accordance with the pre-specified sequencing information, with timing that is synchronous with the received synch input signal 506. As previously discussed, the controller 510 also receives a trigger input that tells the controller to begin generating the control outputs synchronously with the next pulse of the synch input 506. This trigger signal can be provided manually, can be generated by sensing certain events, such as motion within the scene (such as by using a laser to sense the motion), or could be simply the first synch pulse on detected on synch input 506.

Those of skill in the art will appreciate that embodiments of the system of the invention can also operate without a synch signal 506 from the camera 106. The synch signal can instead be generated at regular timed intervals by the system 100 itself. For example the system can be set up to generate its own synch signal at fixed intervals (e.g. one thirtieth of a second) by which to synchronize the control signals that fire the discrete light sources 102 in an array (or arrays) in accordance with the sequencing data. In another embodiment, the system of the invention can fire the first discrete light source 102 of a pre-specified sequence defined by the pre-specified sequencing data when a first synch signal 506 is received from the camera 106, and can then fire the remaining discrete light sources 102 at regular time intervals using a system generated synch signal as described above.

The camera(s) 106 of the embodiments may be a cinema or stills camera (digital or film) and may also be a high speed digital cinema camera. One example of such a camera would be the Phantom Flex camera sold by Vision Research. Consumer grade through professional grade strobe lights can be used as discrete light sources 102. For example, one such suitable strobe light source can be the SB-910 Speedlight, and which is commercially available through Nikon, Inc. The discrete light sources 102 may be supported in the form of arrays (104, 206, 208, 308, 508) using industry standard grip equipment 502 such as the Speed Rail, which is commercially available through Hollaender Manufacturing Company.

Figure 5:
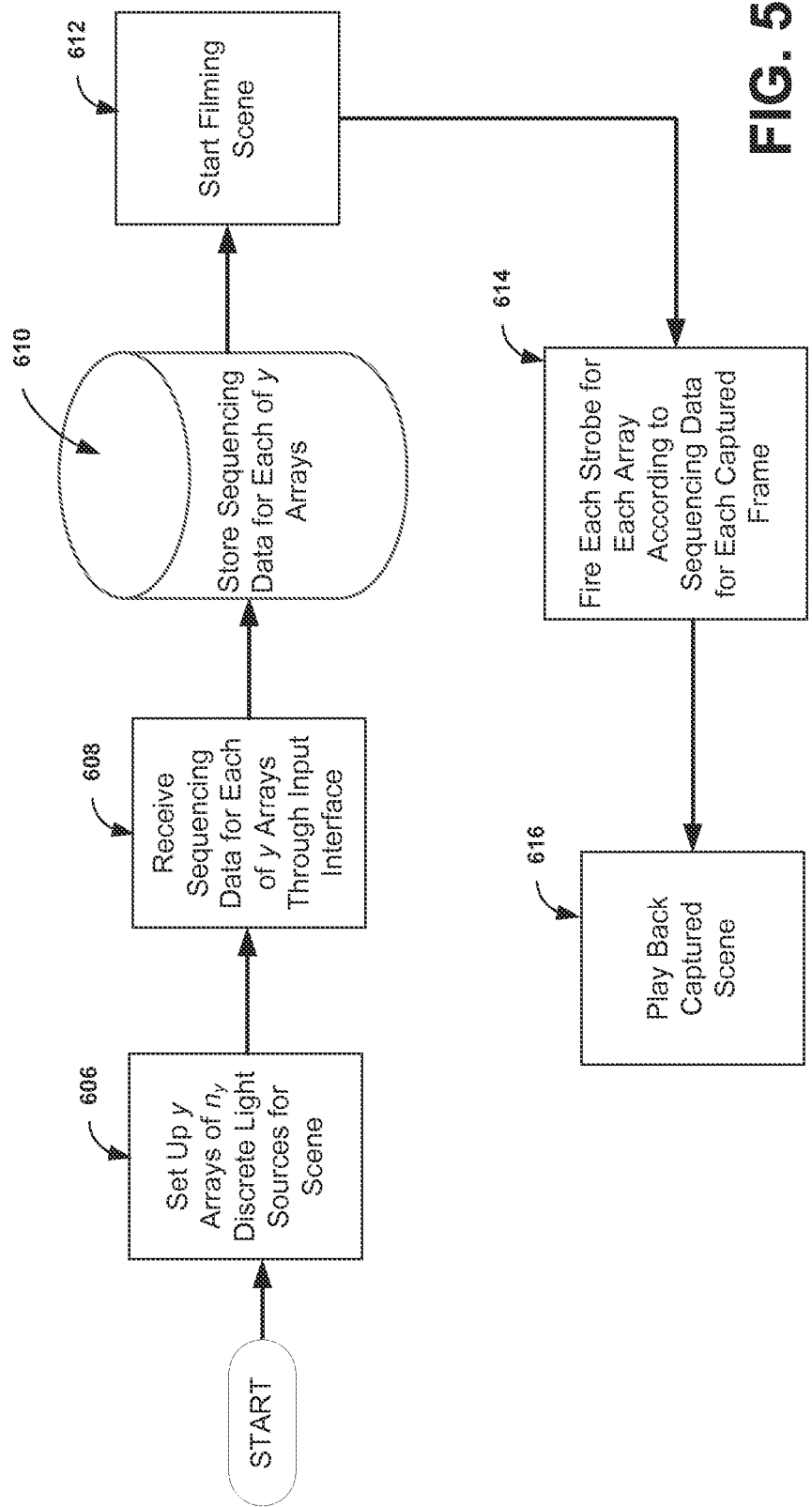
FIG. 5 illustrates a procedural flow diagram of an embodiment of the method of the invention.

FIG. 5 illustrates a procedural flow diagram describing an embodiment of a method of the invention. The method starts at block 606, where one or more (i.e. y) arrays of n discrete light sources are disposed around a scene or area 512 to be captured, with the desired direction of the discrete light sources 102 established as desired. The path of the discrete light source array defines the path over which the virtual continuous light source will be simulated to travel.

At block 608, Sequencing Data defining a pre-specified firing sequence for each of the y arrays, is received through an Input Interface of the controller 510 and is stored at 610 in non-transitory memory in the controller. At block 612, image capture of the scene commences. At block 614, each discrete light source 102 of each array is fired in accordance with the stored pre-specified sequencing data at 610 in response to a trigger signal and synchronously with a synch signal. At block 616, the captured scene is played back, thereby simulating movement of a continuous light source over the path(s) defined by the array(s).

Thus, the present invention operates to simulate physical movement of a virtual continuous light source moving through or around a scene as that scene is being captured by the camera, yet requires no actual physical transport of such light sources. The simulated movement of a virtual continuous light occurs when the footage is played back after being captured by embodiments of the system of the invention and in accordance with embodiments of the method of the invention.

In its simplest form, physical movement of a single virtual continuous light source can be simulated by illuminating a scene with a single array of discrete light sources arranged in accordance with the path the simulated light source should take with respect to the scene being captured. The discrete light sources of the array can be fired in accordance with a pre-determined sequence during each of a series of captured camera image frames. The initiation of each camera frame is associated with a generated synch signal, the synch signal being used to synchronize the generation of control signals that causes the next discrete light source in the array to fire.

When the captured frames are played back in sequence, the captured scene includes the illusion that a virtual continuous light source was physically moved over the path defined by the array during capture. Multiple arrays of discrete light sources can be used to give a scene the illusion of more than one virtual continuous light source moving through or around the scene at a given time. The control unit is capable of processing the signal from a camera operating well in excess of 2000 frames per second.

Because the discrete light sources can be mounted using standard rigging practices, there are few limitations in terms of their placement in or around the scene. The discrete light sources can be placed at standard intervals (to give the impression of a light source traveling at a constant speed), or they can be placed with increasingly greater or lesser intervals between them (to give them impression of a continuous light source that is accelerating or decelerating respectively). Finally, they can be fired in a sequence of virtually any order, with the triggering and the firing of the sequences defined for each independent array capable being completely independent of one another and may therefore be overlapped in any manner desired.

What is claimed is:

1. A system for simulating movement of a virtual continuous light source along a path during a captured scene, the system comprising:
    at least one camera for capturing a sequence of frames of the scene at a predetermined frame rate;
    at least one array of n discrete light sources configured to define the path, each of the n discrete light sources of the at least one array being oriented to illuminate at least a portion of the scene when actuated; and
    a controller having an output interface, the output interface providing at least one of a plurality of control signals to each of the n discrete light sources, the control signals configured to actuate each of the n discrete light sources, wherein the controller generates the control signals to actuate the discrete light sources in accordance with a pre-specified sequence, the control signals being generated synchronously with a synch signal, the synch signal generated at the onset of each captured frame and coupled as an input to the controller.

2. The system of claim 1, wherein the discrete light sources are strobe lights, the strobe lights having a predetermined duration of illumination when actuated.

3. The system of claim 1 wherein the discrete light sources are light emitting diodes (LEDs).

4. The system of claim 1, wherein the synch signal is generated by the at least one camera.

5. The system of claim 1 wherein the controller receives a trigger input, the trigger input defining when the controller should begin generating control signals to actuate the discrete light sources of an array.

6. The system of claim 1 wherein each of the n discrete light sources in the at least one array are separated from adjacent ones of the discrete light sources by a constant distance.

7. The system of claim 6 wherein at least some of the n discrete light sources in the at least one array are separated from adjacent ones of the discrete light sources by an increasing distance.

8. The system of claim 1, wherein the controller includes an input interface for receiving input including the pre-specified sequence for the at least one array, the pre-specified sequence data dictating to the controller the order in which the n discrete light sources are to be actuated for each captured frame.

9. The system of claim 8 wherein the controller includes a general purpose computer.

10. The system of claim 1 having at least a first and a second array, the first array having n discrete light sources and the second array having less than n discrete sources, wherein actuation of each of the discrete light sources of the second array in accordance with a pre-specified sequence for the second array is delayed until the number of frames remaining to be captured by the at least one camera is equal to the number of discrete sources in the second array.

11. A method for simulating movement of each of one or more virtual continuous light sources along a path during a captured scene, the method comprising:
    providing an array of discrete light sources for each of the one or more virtual continuous light sources, the array being configured in accordance with the path over which the movement of the virtual continuous light source is to be simulated;
    arranging each of the discrete light sources of an array to illuminate at least a portion of the scene to be captured;
    for each of the arrays, establishing a pre-specified sequence for each of the discrete light sources of the array;
    capturing images of the scene using at least one camera at a predetermined frame rate for a predetermined number of frames; and
    actuating each of the discrete light sources of each array on a frame by frame basis in accordance with the pre-specified sequence established for that array as the scene is captured.

12. The method of claim 11, further comprising playing back the captured images of the frames of the scene.

13. The method of claim 11 wherein the discrete light sources are strobe lights.

14. The method of claim 11, wherein the discrete light sources are LEDs.

15. The method of claim 11, wherein said actuating is performed synchronously with the onset of each captured frame on a frame by frame basis.

16. The method of claim 15 wherein said actuating includes generating control signals to actuate each of the discrete light sources in accordance with the pre-specified sequence, control signals generated synchronously in conjunction with a synch signal that is generated by the at least one camera while performing said image capture.

17. The method of claim 11 wherein said actuating for an array is independently gated by a triggering signal for each of the one or more arrays.

18. The method of claim 17 wherein the controller receives the pre-specified sequencing data for each array through an input interface.

19. The method of claim 18 wherein in the input interface is a graphical user interface (GUI).

20. The method of claim 11 wherein the controller includes a general purpose computer that provides an input interface, and is coupled to an output interface that generates the control signals.

21. The method of claim 11 wherein at least some of the discrete light sources in at least one array are separated from adjacent ones of the discrete light sources by a variable distance.

* * * * *